United States Patent
Diochon et al.

(10) Patent No.: US 7,677,493 B2
(45) Date of Patent: Mar. 16, 2010

(54) ENGINE ASSEMBLY FOR AIRCRAFT COMPRISING AN ENGINE AND A MOUNTING DEVICE FOR SUCH AN ENGINE

(75) Inventors: Lionel Diochon, Toulouse (FR); Samir El Hammami, Grenoble (FR); Julie Le Louvetel-Poilly, Lyons (FR); Jean-Baptiste Dumas, Rochetaillee sur Saone (FR); Nicolas Koenig, Heimsbrunn (FR)

(73) Assignee: Airbus France, Toulouse (FR)

( * ) Notice: Subject to any disclaimer, the term of this patent is extended or adjusted under 35 U.S.C. 154(b) by 210 days.

(21) Appl. No.: 11/471,506

(22) Filed: Jun. 21, 2006

(65) Prior Publication Data
US 2007/0108341 A1 May 17, 2007

(30) Foreign Application Priority Data
Jun. 28, 2005 (FR) .................................. 05 51785

(51) Int. Cl.
*B64D 27/00* (2006.01)
(52) U.S. Cl. ........................................ 244/54; 248/554
(58) Field of Classification Search .................. 244/54, 244/55; 248/554
See application file for complete search history.

(56) References Cited
U.S. PATENT DOCUMENTS

| | | | | |
|---|---|---|---|---|
| 3,327,971 A * | 6/1967 | Alexander et. al. | ............ | 244/54 |
| 3,979,087 A * | 9/1976 | Boris et al. | .................... | 244/54 |
| 4,266,741 A * | 5/1981 | Murphy | ........................ | 244/54 |
| 5,275,357 A * | 1/1994 | Seelen et al. | .................. | 244/54 |
| 5,497,961 A * | 3/1996 | Newton | ........................ | 244/54 |
| 5,620,154 A * | 4/1997 | Hey | ............................. | 244/54 |
| 6,126,110 A * | 10/2000 | Seaquist et al. | ............... | 244/54 |
| 2002/0104924 A1* | 8/2002 | Roszak | ........................ | 244/54 |

* cited by examiner

*Primary Examiner*—Michael R Mansen
*Assistant Examiner*—Michael Kreiner
(74) *Attorney, Agent, or Firm*—Oblon, Spivak, McClelland, Maier & Neustadt, L.L.P.

(57) ABSTRACT

The invention relates to an aircraft engine assembly (1) including an engine (6) and an engine mounting device (4), the mounting device being designed to be inserted between a wing of the aircraft and the engine, and comprising a rigid structure (8) and means of mounting the engine onto the rigid structure, the mounting means comprising a forward fastener (10) and an aft fastener (12). According to the invention, the aft fastener comprises two aft half-fasteners (12a) that will each resist at least the forces applied along a longitudinal direction (X) of the engine, and the two aft half-fasteners are arranged so that a horizontal plane (P) passing through a longitudinal axis (5) of the engine passes through each of them.

13 Claims, 2 Drawing Sheets

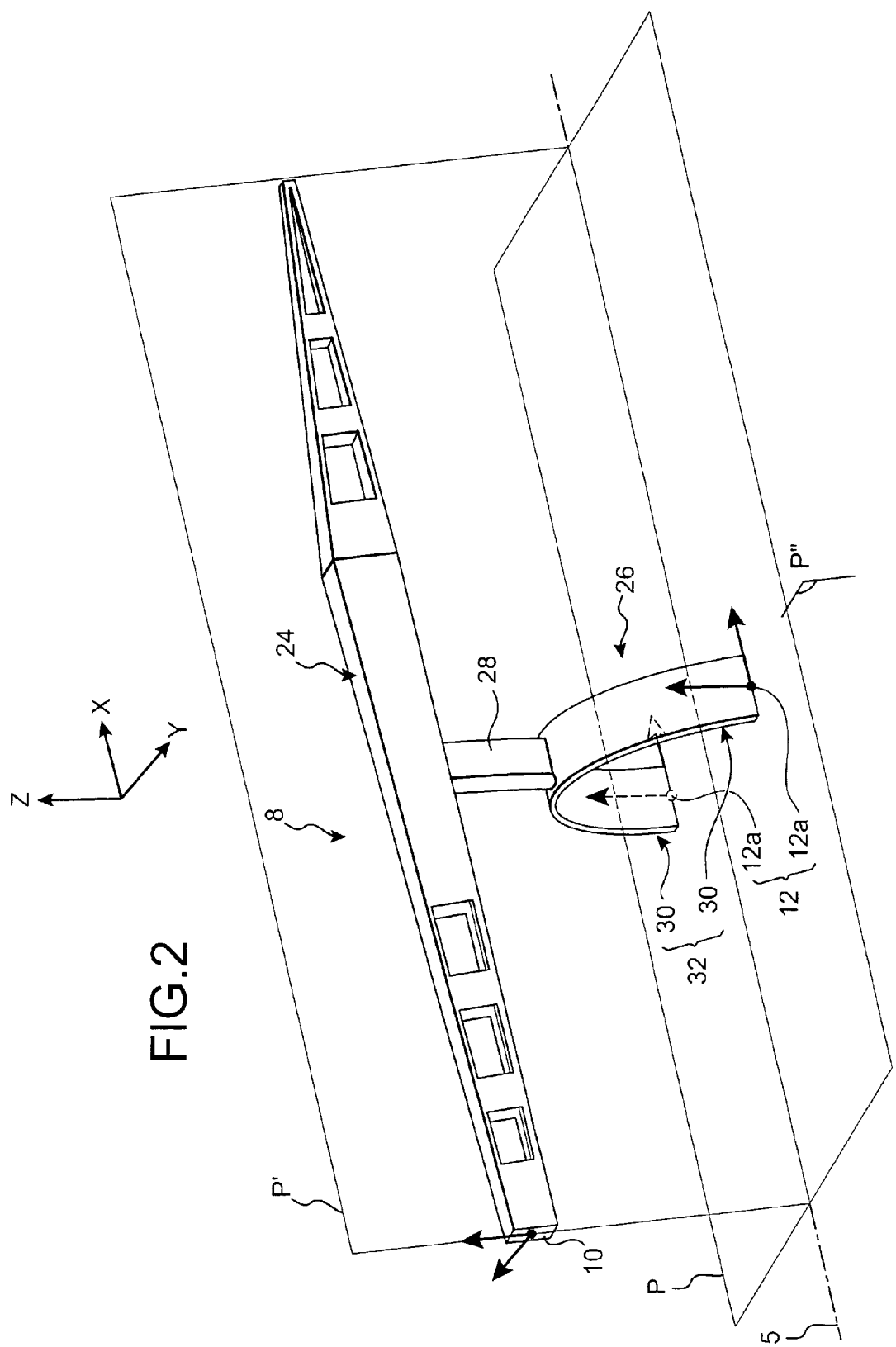

ENGINE ASSEMBLY FOR AIRCRAFT COMPRISING AN ENGINE AND A MOUNTING DEVICE FOR SUCH AN ENGINE

TECHNICAL DOMAIN

This invention relates in general to the domain of mounting devices for engines that will be inserted between an aircraft wing and an engine, and more particularly an engine assembly comprising such a mounting device.

The invention may be used on any aircraft type fitted with turbojets or turboprops, or any other type of engine.

This type of mounting device, also called an Engine Mounting Structure (EMS) is used to suspend a turbo engine below the wing of an aircraft, or to mount this turbo engine above said wing.

STATE OF PRIOR ART

A mounting device of an aircraft is designed to form the connecting interface between an engine and a wing of the aircraft. It transmits forces generated by the associated engine to the aircraft structure, and it also enables routing of the fuel, electricity, hydraulics and air between the engine and the aircraft.

In order to transmit forces, the pylon comprises a rigid structure, for example of the <<box>> type, in other words formed by the assembly of upper and lower spars connected to each other through transverse ribs.

Furthermore, the pylon is equipped with mounting means inserted between the engine and the rigid structure of the pylon, these means globally including at least two fasteners, usually a forward fastener and an aft fastener.

Furthermore, the mounting means include a system for resisting thrust forces generated by the engine. In prior art, this device is typically in the form of two lateral connecting rods connected firstly to a forward part of the central casing of the engine or to an aft part of the fan casing, and secondly to the forward fastener or to the aft fastener.

Similarly, the mounting device also comprises a mounting system inserted between the pylon and the wing of the aircraft, this system normally being composed of two or three fasteners.

Finally, the pylon is provided with a secondary structure segregating and maintaining the systems while supporting aerodynamic fairings.

In a manner generally known to those skilled in the art, thrust forces generated by the engine normally cause more or less severe longitudinal bending of the engine, namely bending resulting from a torque derived from thrusts and applied along a transverse axis of the aircraft.

Two cases can arise when such longitudinal bending occurs, particularly during cruising phases of the aircraft. In a first case in which no particular precautions have been taken for the observed bending, high friction inevitably occurs firstly between rotating blades of the fan and the fan casing, and secondly between the rotating blades of the compressor and the turbine and the engine central casing. The main consequence of this friction is then premature wear of the engine which is obviously prejudicial to its life and performances. In a second case in which adapted functional clearances are provided such that there is practically never any contact due to longitudinal bending, the engine efficiency is then very much reduced.

Considering the above, it is obvious that it is necessary to provide mounting means that minimize longitudinal bending of the engine due to the thrusts, so as to minimize constraining friction, without needing to oversize the operating clearances mentioned above.

It has been observed that mounting means according to prior art, and more precisely their thrust resistance devices, are incapable of satisfactorily limiting the longitudinal bending of the engine due to torque about the transverse axis related to thrusts, particularly during aircraft cruising phases.

OBJECT OF THE INVENTION

Therefore, the purpose of the invention is to propose an aircraft engine assembly that at least partially overcomes the disadvantages mentioned above related to embodiments according to prior art.

To achieve this, the object of the invention is an aircraft engine assembly including an engine and an engine mounting device, the mounting device being designed to be inserted between a wing of the aircraft and the engine, and comprising a rigid structure and means of mounting the engine onto the rigid structure, the mounting means comprising a forward fastener and an aft fastener. According to the invention, the aft fastener comprises two aft half-fasteners that will each resist at least the forces applied along a longitudinal direction of the engine, and the two aft half-fasteners are arranged so that a horizontal plane passing through a longitudinal axis of the engine passes through each of them.

Advantageously, the mounting system according to the invention is provided with mounting means that considerably improve resistance to thrust forces compared with what is possible according to prior art using the conventional solution of lateral connecting rods, since this device can considerably reduce the torque about the transverse axis applied to the engine and related to these thrust forces without it being necessary to use lateral connecting rods.

Consequently, during aircraft cruising phases, the specific positioning of the two aft half-fasteners resisting thrust forces implies that there is practically no longitudinal bending on the engine. In this way, no premature wear of engine components is observed, and therefore the life and performances of the engine are no longer reduced.

Longitudinal bending of the engine due to thrust forces is eliminated firstly by the fact that these forces are resisted by the aft fastener alone and no longer using the resisting device as was the case before, at the horizontal plane passing through the longitudinal axis of the engine which is very advantageous since thrust forces are generated along the longitudinal axis of this engine.

Preferably, the rigid structure comprises a main box and a fork with a base and two branches, the base being fixed to the main box and the free end of each of the two branches supporting one of the two aft half-fasteners.

The proposed arrangement is such that the two lower ends of the fork forming its two free ends are also located on this same horizontal plane passing through the longitudinal axis of the engine, so that they can be connected to the two aft half-fasteners located on this same horizontal plane, and for example connected to the central casing of the engine.

Furthermore, the thrust forces that are applied along the longitudinal direction and that are resisted initially on the horizontal plane passing through the longitudinal axis of the engine through the half-fasteners and the lower ends of the fork, are then transported upwards along the length of this fork and before passing through the box fixed to this same fork.

Preferably, the two branches of the fork jointly form a half-ring, this shape being preferred so as to limit disturbances of the gas flow output from the annular fan duct. To achieve this, this half-ring is preferably centered on the longitudinal axis of the engine.

It would be possible for this half-ring to be arranged in a plane orthogonal to the longitudinal direction of the engine, in which the base of the fork is also located.

Conventionally, working in the direction from the forward end to the aft end, the engine comprises a fan casing, a central casing and an ejection casing.

It is then possible to provide two aft half-fasteners fixed to the central casing. An alternative is to provide said aft half-fasteners fixed to the ejection casing.

With the first proposed solution in which the two aft half-fasteners are fixed to the engine central casing, the longitudinal deformed shape of the engine is less exaggerated due to the smaller distance between the forward and the aft fasteners. Furthermore, damaging parasite narrow waist ovalling effects can be limited, these effects normally being encountered due to the difference in cross-section between the central casing and the ejection casing.

Conventionally, the forward fastener is preferably fixed to the fan casing, on an upper annular part of the fan casing.

In this engine assembly in which mounting means consist exclusively of the forward fastener and the aft fastener, it is possible that the engine forward fastener is designed so as to resist forces applied along a transverse direction of the engine and along a vertical direction of the engine, and that the two aft half-fasteners are each designed to as to resist forces applied along the longitudinal direction of the engine and along the vertical direction of the engine.

Finally, advantageously, the mounting system is a statically determinate system, which very much simplifies its design.

Other advantages and special features of the invention will become clearer from the non-limitative description given below.

BRIEF DESCRIPTION OF THE FIGURES

This description will be made with reference to the appended figures wherein:

FIG. 2 shows a perspective view of the rigid structure and means of mounting the engine assembly shown in FIG. 1, the mounting means being shown only diagrammatically;

DETAILED DESCRIPTION OF PREFERRED EMBODIMENTS

Figure 1:
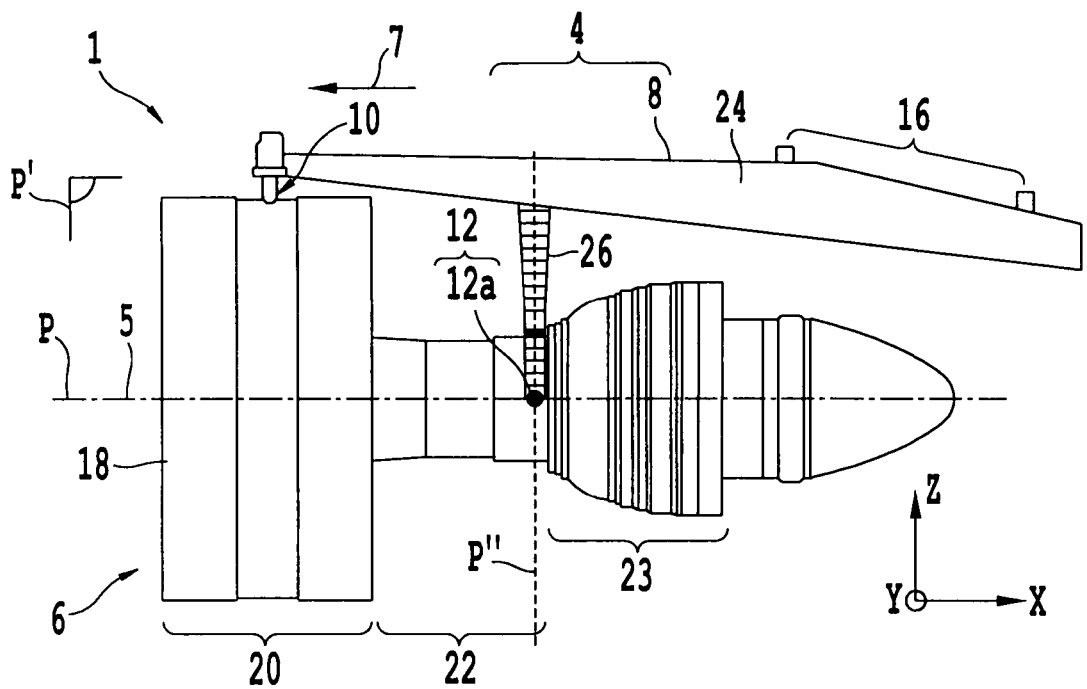
FIG. 1 shows a side view of an engine assembly for an aircraft according to a first preferred embodiment of this invention.

FIG. 1 shows an engine assembly 1 for an aircraft designed to be fixed under a wing (not shown) of this aircraft, this assembly 1 being in the form of a first preferred embodiment of this invention comprising a mounting device 4 and an engine 6 such as a turbojet mounted under this device 4.

Globally, the mounting device 4 comprises a rigid structure 8 supporting means of mounting the engine 6, these mounting means being provided with a plurality of engine fasteners 10, 12, preferably two.

For information, note that the assembly 1 is designed to be surrounded by a pod (not shown) and that the mounting device 4 comprises another series of fasteners 16 used to suspend this assembly 1 under the wing of the aircraft.

Throughout the following description, by convention X refers to the longitudinal direction of the device 4 that is also referred to as the longitudinal direction of the turbojet 6, this direction X being parallel to a longitudinal axis 5 of this turbojet 6. Furthermore, the direction transverse to the device 4 is called Y and can be considered to be the same as the transverse direction of the turbojet 6, and Z is the vertical direction or the height, these three X, Y and Z directions being orthogonal to each other.

Furthermore, the terms <<forward>> and <<aft>> should be considered with respect to the direction of movement of the aircraft that occurs as a result of the thrust applied by the turbojet 6, this direction being shown diagrammatically by the arrow 7.

FIG. 1 firstly shows the two engine fasteners 10, 12, the series of fasteners 16, and the rigid structure 8 of the mounting device 4. The other constituents not shown of this device 4, such as the secondary structure segregating and holding the systems while supporting aerodynamic fairings, are conventional elements identical to or similar to those used in prior art, and known to those skilled in the art. Consequently, no detailed description of them will be made.

Note also that the turbojet 6 has a large fan casing 18 at the forward end delimiting an annular fan duct 20, and comprises a smaller central casing 22 towards the aft end containing the core of the turbojet. Finally, the turbojet 6 terminates towards the aft end in an ejection casing 23 larger than the central casing 22. Obviously, the casings 18, 22 and 23 are fixed to each other.

As can be seen in FIG. 1, there are two engine fasteners 10, 12 on device 4, and they are called the forward engine fastener and the aft engine fastener respectively.

The forward engine fastener 10 is inserted between a forward end of the rigid structure 8, and an upper annular part of the fan casing 18. The forward engine fastener 10 is designed conventionally in a manner known to those skilled in the art, for example using fittings and/or devises.

Furthermore, one of the special features of the invention is the fact that the aft fastener 12 is composed of two aft half-fasteners 12a (only one of which is shown in FIG. 1 which is a side view), each of these two half-fasteners 12a being designed to resist at least forces applied along the direction X. In this way, there is no longer any need to provide a device such as a lateral connecting rod type to resist thrust forces, since these thrusts are resisted through the above mentioned two aft half-fasteners.

Furthermore, in order to optimize transfer resistance to these thrusts and to minimize longitudinal bending of the engine, the two aft half-fastener 12a are arranged so that each passes through a longitudinal plane P passing through the longitudinal axis 5 of the engine 6 (the plane P and the axis 5 being coincident in FIG. 1).

The rigid structure 8 has been adapted to support these half-fasteners 12a, since it comprises not only main box 24 extending from the aft end towards the forward end approximately along the X direction, but also a fork 26 fixed to this box 24 and for which each of the two lower ends carry one of the two half-fasteners 12a. For information, note that the main box 24 is of the known type, in the sense that it is formed from the assembly of upper and lower spars connected to each other through transverse ribs.

More particularly with reference. to FIG. 2, it can be seen that the rigid structure 8 and the mounting means are arranged such that a vertical plane P' passing through the axis 5 of the engine 6 forms a plane of symmetry.

Furthermore, the fork 26 is globally placed in a plane P'" orthogonal to the X direction, in other words a YZ plane. It is composed of a base 28 connected to the lower spar of the main box 24, and two branches 30 each fixed to the lower end of the base 28. For information, the base 28 may be of the rigid box type, in other words comprising spars, ribs and side panels, preferably with fairings so as not to disturb the aerodynamic flow.

While the upper ends of the two branches 30 are fixed to each other at the junction with the base 28, the lower ends (called the free ends) of these same branches 30 support the two half-fasteners 12a that are made conventionally in a manner known to those skilled in the art, for example using fittings and/or devises. Thus, the two lower ends of the branches 30 of the fork 26 are also arranged so that the horizontal plane P passing through the longitudinal axis 5 of the engine 6 passes through each of the two lower ends of the branches.

As can be seen in FIG. 2, the two branches 30 located in the plane P'" jointly form a half ring 32, preferably centered on the axis 5 of the engine 6 so as to limit gas flow disturbances output from the annular fan duct 20.

In this first preferred embodiment of this invention, the aft fastener 12 and the fork 26 are arranged such that the two half-fasteners 12a are connected onto the engine 6 at an aft end of the small central casing 22, just before the junction with the ejection casing 23. In particular, this arrangement advantageously limits damaging forces due to parasite narrow waist effect bending moments.

As can be seen diagrammatically in FIG. 2, with such a statically determinate arrangement the fixed forward engine fastener 10 is designed so as to resist forces applied mainly along the vertical direction Z, and also along a transverse direction Y, but are not capable of resisting forces applied along the longitudinal direction X.

On the other hand, the two half-fasteners 12a of the aft engine fastener 12 are designed to resist forces applied mainly along the longitudinal direction X and along the vertical direction Z, but are not capable of resisting forces applied along the transverse direction Y.

As mentioned above, note that these mounting means do not include any device of the type with lateral connecting rods for resisting thrusts.

Forces applied along the longitudinal direction X are resisted exclusively by the two aft half-fasteners 12a, the forces being applied along the transverse direction Y are resisted exclusively by the forward fastener 10, and forces applied along the vertical direction Z are resisted jointly by the forward fastener 10 and the two half-fasteners 12a of aft fastener 12.

Furthermore, the moment applied about the X direction is resisted only by the two half fasteners 12a of the aft fastener 12, while the moments applied about the direction Y are resisted jointly by these two half-fasteners 10, 12. Furthermore, the moment applied about the Z direction is also resisted by the half-fasteners 12a of the aft fastener 12.

Figure 3:
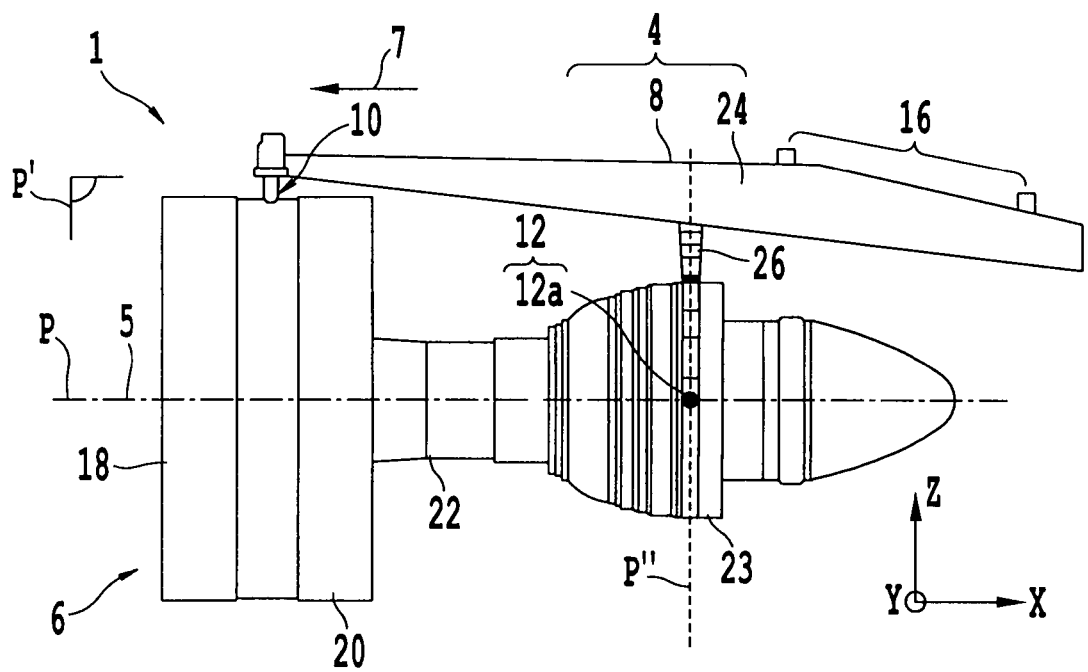
FIG. 3 shows a side view of an engine assembly for an aircraft according to a second preferred embodiment of this invention.

We will now refer to FIG. 3 showing an engine assembly 1 according to a second preferred embodiment of this invention, it can be seen that the only difference from the first embodiment shown in FIGS. 1 and 2 consists of positioning the fork 26 and the aft engine fastener 12 further in the aft direction, such that the two aft half-fasteners 12a are mounted fixed oh the ejection casing 23 of the engine 6, and preferably close to an aft end of this engine 6.

In this second embodiment in which the plane P'" in which the fork 26 is located is offset towards the aft direction, the horizontal plane passing through a longitudinal axis 5 of the engine 6 also naturally passes through the lower ends of the branches of the fork and the two aft half-fasteners 12a.

Obviously, various modifications can be made by those skilled in the art to the engine 1 assemblies for an aircraft that have just been described, solely as non-limitative examples.

The invention claimed is:

1. An engine assembly for an aircraft, comprising:
an engine configured to produce thrust along a longitudinal axis of the engine, the engine including
a fan casing configured to enclose a fan of the engine,
a central casing configured to enclose a combustor of the engine,
and an ejection casing configured to enclose a low-pressure turbine of the engine;
a rigid structure includes a main box and a fork, the fork having a base and two branches, said base being fixed to the main box and a free end of each of the two branches supporting one of two aft half-fasteners, and the fork is configured to hold the engine solely through the two aft half-fasteners; and
a mounting structure configured to mount the engine onto said rigid structure, said mounting structure including
a forward fastener configured to fasten the rigid structure to the engine at the fan casing, said fastener is configured to resist forces applied along a vertical direction Z and along a transverse direction Y, and said forward fastener is configured to allow the engine to move along a longitudinal direction X without substantial resistance, and
two aft half-fasteners, each of the two aft half-fasteners being configured to resist at least forces applied along the longitudinal axis of the engine, said two aft half-fasteners are arranged so that a horizontal plane passing through said longitudinal axis of the engine passes through each of said two aft half-fasteners, and the two aft half-fasteners are connected to the engine at an aft end of the central casing before a junction with the ejection casing,
wherein the junction between the ejection casing and the central casing is disposed at a longitudinal position between the combustor of the engine and the low-pressure turbine.

2. An engine assembly according to claim 1, wherein said two branches of the fork jointly form a half-ring.

3. An engine assembly according to claim 2, wherein said half-ring is arranged in a plane orthogonal to the longitudinal axis of the engine.

4. An engine assembly according to claim 3, wherein said base of the fork is also located in the plane orthogonal to said longitudinal axis of the engine.

5. An engine assembly according to claim 1, wherein said engine comprises a fan casing, a central casing and an ejection casing, in order from a forward end to an aft end.

6. An engine assembly according to claim 5, wherein said aft half-fasteners are fixed to the central casing.

7. An engine assembly according to claim 5, wherein said forward fastener is fixed to the fan casing.

8. An engine assembly according to claim 7, wherein said forward fastener is fixed on an upper annular part of the fan casing.

9. An engine assembly according to claim 7, wherein the mounting structure consists exclusively of said forward fastener and said aft fastener.

10. An engine assembly according to claim 7, wherein the two aft half-fasteners are each configured to resist forces applied along the longitudinal direction of the engine and along the vertical direction Z of the engine.

11. An engine assembly according to claim 7, wherein said mounting structure forms a statically determinate system.

12. An engine assembly according to claim 1, wherein said forward fastener is constituted by a single connector connecting said rigid structure to a top of a forward portion of said engine, said top being relative to said vertical direction Z, such that said forward portion of said engine is supported by the rigid structure at a single location.

13. An engine assembly according to claim 12, wherein said engine is supported by the rigid structure at only three locations, one location corresponding to said single location at said forward portion of said engine, and two other locations corresponding to said two aft half-fasteners at said aft end of the central casing.

* * * * *